US012612268B2

(12) United States Patent
Schlesinger et al.

(10) Patent No.: US 12,612,268 B2
(45) Date of Patent: Apr. 28, 2026

(54) SYSTEM AND METHOD FOR MONITORING COMPONENTS MOVING IN AUTOMATED FEED SYSTEM

(71) Applicant: Solaredge Technologies Ltd., Herzeliya (IL)

(72) Inventors: Adi Schlesinger, Binyamina (IL); Tal Weidenfeld, Ganer (IL); Jeremy Dray, Ashdod (IL)

(73) Assignee: Solaredge Technologies Ltd., Herzeliya (IL)

( * ) Notice: Subject to any disclaimer, the term of this patent is extended or adjusted under 35 U.S.C. 154(b) by 165 days.

(21) Appl. No.: 18/407,563

(22) Filed: Jan. 9, 2024

(65) Prior Publication Data

US 2024/0239617 A1     Jul. 18, 2024

Related U.S. Application Data

(60) Provisional application No. 63/479,657, filed on Jan. 12, 2023.

(51) Int. Cl.
| | |
|---|---|
| *B65G 51/16* | (2006.01) |
| *B65G 51/24* | (2006.01) |
| *B65G 51/36* | (2006.01) |
| *G05B 15/02* | (2006.01) |

(52) U.S. Cl.
CPC ............. *B65G 51/16* (2013.01); *B65G 51/24* (2013.01); *B65G 51/36* (2013.01); *G05B 15/02* (2013.01); *B65G 2203/025* (2013.01)

(58) Field of Classification Search
None
See application file for complete search history.

(56) References Cited

U.S. PATENT DOCUMENTS

| | | | | | |
|---|---|---|---|---|---|
| 3,210,130 | A | * | 10/1965 | Kelly | B65G 51/02 |
| | | | | | 406/153 |
| 3,711,038 | A | * | 1/1973 | Van Otteren | B65G 51/04 |
| | | | | | 406/84 |
| 3,731,647 | A | * | 5/1973 | Mimbiole, Jr. | B05C 3/10 |
| | | | | | 118/667 |
| 3,938,976 | A | * | 2/1976 | Walker | C03B 5/245 |
| | | | | | 414/148 |
| 4,178,662 | A | * | 12/1979 | Borodin | B65G 51/16 |
| | | | | | 406/84 |

(Continued)

*Primary Examiner* — Joseph A Dillon, Jr.
(74) *Attorney, Agent, or Firm* — Banner & Witcoff, Ltd.

(57)     ABSTRACT

There is provided a method and system for monitoring a component moving in a delivery tube of a feed system in an automated production line. The method includes determining a velocity of the component that moves through the delivery tube and comparing the velocity to a predefined velocity range. The system includes at least one sensor configured to detect the component when the component passes through a first point and through a second point within the delivery tube;
and a controller, wherein the at least one sensor is operatively coupled to the controller. The sensor may be configured to send a first signal when the component passes through the first point and a second signal when the component passes through the second point and the controller may be configured to determine velocity of the component by measuring a time interval between the first signal and the second signal.

20 Claims, 8 Drawing Sheets

(56) References Cited

U.S. PATENT DOCUMENTS

| | | | | |
|---|---|---|---|---|
| 4,275,976 A * | 6/1981 | Sticht | B65G 51/38 | 406/28 |
| 5,014,876 A * | 5/1991 | Young | B23P 19/003 | 221/268 |
| 5,570,567 A * | 11/1996 | Laubscher | B65B 21/06 | 414/792.5 |
| 5,725,124 A * | 3/1998 | Bustos | G07F 7/00 | 221/211 |
| 6,039,510 A * | 3/2000 | Greene | B65G 51/20 | 406/84 |
| 6,068,428 A * | 5/2000 | Nair | B65G 51/01 | 406/84 |
| 6,210,080 B1 * | 4/2001 | Haul | B65G 51/02 | 406/84 |
| 6,264,063 B1 * | 7/2001 | Turner | B23P 19/003 | 221/95 |
| 6,309,144 B1 * | 10/2001 | Ingraham | B65G 51/035 | 406/93 |
| 6,322,295 B1 * | 11/2001 | Gabriele | B65G 51/02 | 406/84 |
| 6,379,464 B1 * | 4/2002 | Martel | B05B 12/122 | 118/672 |
| 6,447,215 B1 * | 9/2002 | Wellmar | B65G 53/66 | 406/122 |
| 7,326,005 B1 * | 2/2008 | Castro | B65G 51/22 | 406/19 |
| 7,401,695 B2 * | 7/2008 | DerMarderosian | B65G 11/203 | 406/84 |
| 7,950,879 B2 * | 5/2011 | Hoganson | B65G 51/08 | 406/10 |
| 8,500,373 B1 * | 8/2013 | Epps | B65G 51/16 | 406/13 |
| 8,869,718 B2 * | 10/2014 | Binsirawanich | A01C 7/081 | 406/14 |
| 8,920,078 B2 * | 12/2014 | Woolever | B65G 53/66 | 406/14 |
| 9,957,113 B1 * | 5/2018 | Trinh | B65G 47/261 | |
| 10,287,109 B2 * | 5/2019 | Sørensen | B65G 51/02 | |
| 10,401,303 B1 * | 9/2019 | Baran-Harper | G01N 21/956 | |
| 10,926,965 B2 * | 2/2021 | Kelly | B65G 53/50 | |
| 11,453,018 B2 * | 9/2022 | Arunmozhi | F16L 27/023 | |
| 11,772,906 B2 * | 10/2023 | Zhao | B65G 47/268 | 198/781.06 |
| 11,906,944 B2 * | 2/2024 | Prajapati | G06Q 10/0639 | |
| 11,993,467 B2 * | 5/2024 | Faletti | G07D 11/16 | |
| 12,344,214 B2 * | 7/2025 | Loch | B60T 17/004 | |
| 2004/0245071 A1 * | 12/2004 | Giffin | B65H 29/12 | 198/460.1 |
| 2005/0276679 A1 * | 12/2005 | Frich | B65G 1/1378 | 414/273 |
| 2007/0284222 A1 * | 12/2007 | Dermarderosian | B65G 51/20 | 198/618 |
| 2010/0185411 A1 * | 7/2010 | Pfeiffer | G08G 1/01 | 340/686.1 |
| 2013/0081777 A1 * | 4/2013 | Orsi | B22D 11/165 | 164/452 |
| 2013/0166065 A1 * | 6/2013 | Boschert | B65G 43/08 | 700/230 |
| 2019/0225431 A1 * | 7/2019 | Steinbrueck | G01F 23/2924 | |
| 2019/0263601 A1 * | 8/2019 | Berg | B65G 43/00 | |
| 2020/0391231 A1 * | 12/2020 | Arunmozhi | F16L 27/023 | |
| 2021/0269242 A1 * | 9/2021 | Eckman | B65G 1/1375 | |
| 2022/0281049 A1 * | 9/2022 | Nicholson | G05B 19/4183 | |
| 2023/0202777 A1 * | 6/2023 | Thompson | A01C 21/005 | 406/14 |
| 2024/0239617 A1 * | 7/2024 | Schlesinger | B65G 51/36 | |

* cited by examiner

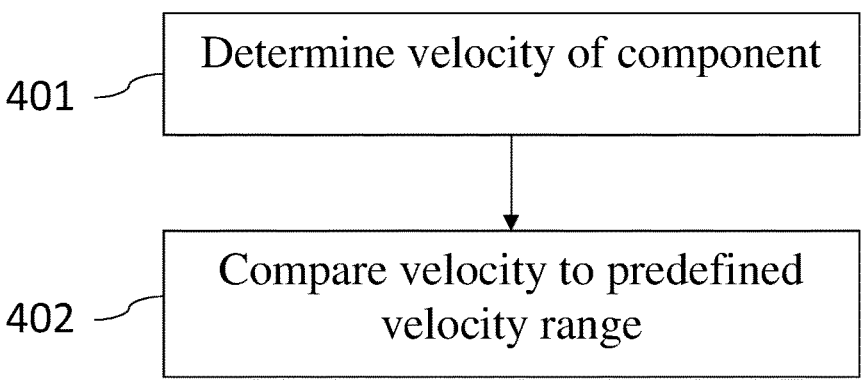

401 — Determine velocity of component

402 — Compare velocity to predefined velocity range

FIGURE 4A

411 — Detect first time when component passes through first point

412 — Detect second time when component passes through second point

413 — Determine difference between first time and second time

414 — Calculate velocity

421 — Analyze previously calculated velocities

422 — Derive predefined velocity range

431 — Compare calculated velocity to predefined velocity range

FIGURE 4B

SYSTEM AND METHOD FOR MONITORING COMPONENTS MOVING IN AUTOMATED FEED SYSTEM

CROSS-REFERENCE TO RELATED APPLICATIONS

This application claims the benefit of U.S. Provisional Application No. 63/479,657, filed on Jan. 12, 2023. The above-referenced application is hereby incorporated by reference in its entirety.

BACKGROUND

The present disclosure relates to a system and method for monitoring components moving in a feeding system of an automated production line.

An automated production line includes a series of workstations linked by a transfer system and a control system, wherein each station performs a specific operation and a product is processed step by step as it moves along the line in a pre-defined production sequence. At a workstation components are manipulated and fitted to other components, e.g., by means of an assembly device, to form assemblies. Automated production lines typically employ automated feed systems that are configured to deliver components of the product to their intended workstation. The feed system may be composed of a feeder device and a delivery tube. For example, the feed system may be configured to automatically separate bulk components, insert them in a specified orientation into the delivery tube and transfer them through the tube to an assembly device to be connected to other components of the product. Feed systems are typically employed in high-rate production environments, wherein components move through the delivery tube in a continuous manner. The feed systems can operate at various speeds, with capabilities of 1,000 parts or more being dispensed per minute. Feed systems may be used to deliver various types of components, including, inter alia, fasteners, coils, electronic parts, medical device components, and tubing.

Rapidity, repeatability and reliability are critical aspects of modern automated production lines. One of the major problems associated with the use of automated feed systems is that normally there is no inspection of the supplied components, wherein misshapen or foreign components that are delivered to the workstation, and in particular, to the assembly device, may not only impair the final product, but also cause a breakdown and even stop the entire production line.

While certain feeder devices may be designed to also act as inspection devices that reject misshapen parts and prevent them from being delivered to the assembly device, manufacturing such devices is complicated and expensive. Manual inspection of components before they enter the delivery tube would introduce an additional step into the production process, is time-consuming and unreliable. Alternative automated inspection systems for components delivered by feeder systems are therefore needed.

BRIEF SUMMARY OF THE INVENTION

The following presents a simplified summary of disclosed aspects in order to provide a basic understanding of these aspects. This summary is not an extensive overview of the aspects. It is not intended to identify key or critical elements or to delineate the scope of the disclosure.

Aspects of the disclosure relate to a system and method for monitoring a component moving in a delivery tube. The delivery tube may be a part of a feed system. The cost-efficient and automated method and system as disclosed herein are compatible with various automated manufacturing processes and enable measuring, and, optionally, adjusting velocity of the component. Analyzing the velocity at which the component moves within the delivery tube may be used to adjust the operating conditions of the component delivery process and/or to distinguish between normal and faulty components. For example, when at least one property of a component differs from a defined set of properties, such as, inter alia, its shape, weight, size, or material the component is made of, the different property will affect the velocity of the component moving within the delivery tube as compared to a velocity of a normal component with the defined set of properties. The system and method of the present invention are particularly suitable for monitoring various mechanical or electrical components being delivered to an assembly device in an automatic production line. Without wishing to being bound by theory or mechanism of action, it is contemplated that when the difference in at least one property is significant enough to affect the assembly process, the difference will also affect the velocity of the component within the delivery tube in such a manner that it would be measurably distinguishable from the velocity of the normal component.

The system and method of the present invention are based on the detection of passage of the component through predetermined points along the delivery tube as a function of time. Determining the time required for the component to move between at least two points within the delivery tube, while a distance between the at least two points is known or can be measured, allows to calculate the velocity of the component. Determining the velocity of a plurality of identical components being employed in a system having specific parameters and operating conditions allows to define a normal velocity range that is characteristic of a normal component. The normal velocity range may be further used as a standard for in-situ monitoring and analyzing components moving in the delivery tube with the specific parameters and operating conditions. Detecting components which have a velocity outside of the normal velocity range may indicate that the component is defective, e.g., having a different size or being made of a different material, and as such may pose a risk of affecting the automated production line, e.g., by damaging the assembly device and/or halting the entire production process. The term "velocity" used herein may refer to a determined velocity. The velocity may be determined based on a measured distance and measured time intervals related to the component.

The system and method of the present invention may also prevent the faulty component from reaching an assembly area within the workstation, and the assembly device, in particular. For example, the delivery tube may be constructed to include a junction that allows diverting the component from its route to an assembly area when its velocity is found to be outside of the normal velocity range. Additionally, the system may include means for providing an alert, such as an indicator. The indicator may be configured for alerting a technician that supervises the production line about such faulty components. The indicator may include a visual display, a light indication, an audio speaker, etc.

The specific operating conditions may include, inter alia, a pressure within the delivery tube. The in-situ measured velocity of the components may further be used to control the pressure. For example, if a number of consecutive components each have a velocity that is outside of the normal velocity range, the pressure within the tube may be controllably increased or decreased (depending on the measured velocity) until the velocity of the subsequent components reaches the value that in within the normal velocity range.

Advantageously, the monitoring system of the present invention may be used with various types of delivery tubes and does not require significant remodeling of the existing feed systems or introduction of complex hardware. The passage of the component through the predetermined points along the delivery tube may be detected by one or more sensors, such as position sensors that are connected to a mutual time monitoring system. Analysis of the sensors' signal may be performed by a controller configured to calculate the velocity based on the time interval between the signals received from the one or more sensors and the distance between the points. The controller may further be configured to compare the calculated velocity to the normal velocity range to identify faulty components, to induce the diversion of the component from its route to the assembly point, to control the means for providing the alert (e.g., for the technician) about a faulty component, and/or to control pressure adjustment within the delivery tube.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 4A, 4B, and 5 schematically illustrate steps of a method for monitoring/controlling a component moving in a delivery tube; in accordance with some embodiments of the invention.

DETAILED DESCRIPTION OF THE INVENTION

Figure 1A:
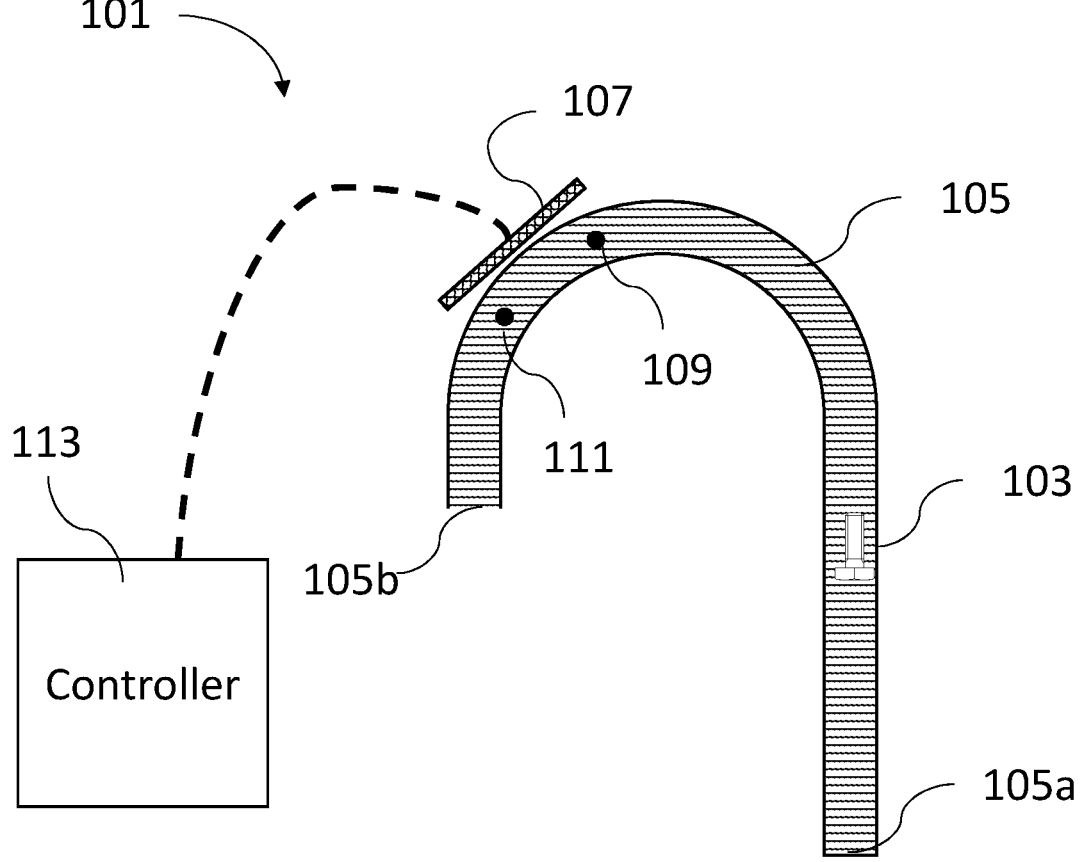
FIG. 1A schematically illustrates a system for monitoring a fastener moving in a delivery tube, in accordance with some embodiments of the invention.

Unless defined otherwise, all technical and scientific terms used herein have the same meaning as commonly understood by one of ordinary skill in the art to which this disclosure belongs.

One or more features of the present invention relate to a system and method for monitoring and/or controlling of components moving in a delivery tube, and to a feed system that includes such monitoring system. The method and system of the present invention allow in-situ monitoring of components that move in an automated production line, and, in particular, in a delivery tube of a feed system, e.g., between a feeder device and an assembly area. The assembly area may include an assembly device that is configured to connect the component to one or more additional components of the intended product. The monitoring system of the present invention may therefore be coupled to or be a part of a production line equipment, such as, for example, a feed system. The monitoring is based on determining a velocity of the component within the delivery tube; and comparing the velocity to a predefined velocity range. The velocity of the component that is outside of the predefined velocity range may provide an indication of a defective component (e.g., being made of a different material or having a different shape or size than that of the components compatible with the assembly device) and/or non-optimal conditions for component delivery (e.g., a non-optimal pressure within the tube that affects component velocity). The system and method of the present invention may further be configured to prevent the defective component from reaching the assembly area and/or to adjust the operating conditions of the delivery tube. The term "velocity" used herein may refer to a determined velocity. The velocity may be determined based on a measured distance and measured time intervals related to the component.

A component that may be monitored by the system and method of the present invention may be any component that can be used in manufacturing of a product in an automated production line including at least one assembly area, wherein the component is adapted for being delivered to the assembly area through a delivery tube of a feed system. The component may be, e.g., a mechanical component, an electronic component, or a fluid conveyance component. The mechanical component may include functional parts of the product, as well as elements required for connecting the functional parts. The component may be an electronic component, such as but not limited to, a resistor, capacitor, diode, inductor, LED, transistor, crystal, oscillator, electromechanical relay, connector, wire, or any part thereof.

In some embodiments, the component is a fastener. The term "fastener", as used herein, refers to any element configured for joining one component to another. Non-limiting examples of a suitable fastener include a screw, bolt, stud, rivet, slug, latch, pin, nut, washer, disc, angle bracket, spring, flange, screw cap, and snap fastener. The bolt may be selected from a regular bolt, a threaded bolt, and a hanger bolt. The screw may be selected from a regular screw, set-screw, self-tapping screw, double ended screw, dowel screw, and security head screw.

The system and method of the present invention are further suitable for monitoring components which may affect operation of the assembly area if they are different from a designated component that is configured to be delivered to the assembly area at the time of monitoring. For example, the components may affect operation of the assembly device. The term "different", as used herein, refers to at least one property of the component that is different, such as, but not limited to, shape, size, weight, material, presence or absence of a certain element, or presence of a defect.

The term "assembly area", as used herein, refers to an area, station, or zone of an automated production line in which a predetermined number of specific components are assembled, fitted or combined. The assembly area may contain an assembly device (also termed herein "setting tool"), which is configured to assemble, fit or combine the predetermined number of specific components.

Figure 1B:
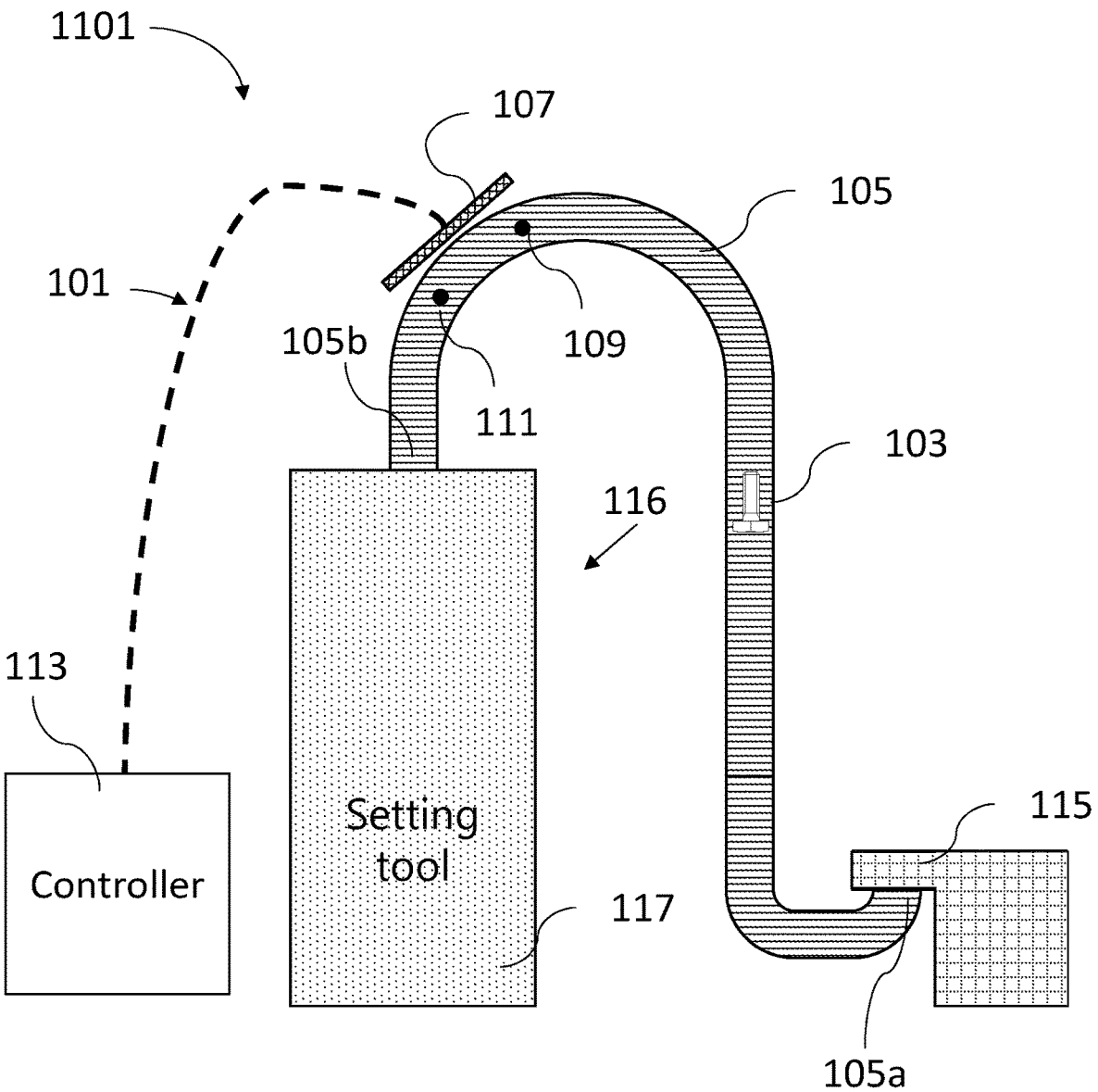
FIG. 1B schematically illustrates a system for monitoring a fastener moving in a delivery tube, wherein the tube is coupled to a feeder device and a setting tool, in accordance with some embodiments of the invention.

Reference is now made to FIG. 1A that schematically illustrates monitoring system 101, FIG. 1B that schematically illustrates feed system 1101, that includes monitoring system 101, and FIGS. 1C-1F showing a certain section of systems 101 and 1101, according to some embodiments of the invention. System 101 allows in-situ monitoring of a component that is fastener 103 that moves through delivery tube 105 of feed system 1101. While these figures and the following figures depict a component that is a fastener and its relevant systems, it should be understood that this is for purpose of example only and that any type of component as described hereinabove may be used.

The term "delivery tube", as used herein, is meant to encompass any configuration or disposition of a chamber, enclosure or passageway.

As shown in FIGS. 1A and 1B, delivery tube contains inlet 105a and outlet 105b. Monitoring system 101 includes at least one sensor 107 configured to detect fastener 103 when it passes through first point 109 and through second point 111 within delivery tube 105. Monitoring system 101 further includes controller 113 that is operatively coupled to sensor 107.

The first point and the second point, and any other points that are positioned along the delivery tube and used in velocity monitoring are also termed herein "detection point".

Velocity of fastener 103 is calculated by measuring a time interval between the detection of fastener 103 by at least one sensor 107 when it passes through first point 109 and the detection of fastener 103 by at least one sensor 107 when it passes through second point 111. A distance between first point 109 and second point 111 may then be divided by the time interval to obtain the velocity. The distance between first point 109 and second point 111 may be measured, e.g., by a ruler, caliper tool or laser distance meter, when a segment of delivery tube 105 between first point 109 and second point 111 is linear, or by a measuring tape, when the segment of delivery tube 105 between first point 109 and second point 111 is non-linear. It is to be understood that when a segment of delivery tube 105 between first point 109 and second point 111 is non-linear, the distance between first point 109 and second point 111 should be measured within or along delivery tube 105, i.e., the distance should correspond to the path of fastener 103 moving between the two points, and not to a shortest (linear) distance between the points.

System 101 may include more than one sensor, e.g., two sensors, such as the sensors shown in FIGS. 1C-1F, three sensors, five sensors or more.

Feed system 1101 includes feeder device 115 that is connected to delivery tube 105. The delivery tube may be connected to an assembly area 116 of an automated production line. The assembly area 116 may include a setting tool 117. For example, delivery tube 105 is connected to setting tool 117. As such, delivery tube 105 interconnects feeder device 115 with setting tool 117. In particular, inlet 105a of delivery tube 105 contacts feeder device 115 and outlet 105b of delivery tube 105 contacts setting tool 117.

The feed system may be designed and operated as known in the art. The delivery tube may be made of a polymer material, inter alia, to allow flexibility and transparency (so that blockage or jams may be detected by visual inspection). The delivery tube may have any shape that is suitable for delivery of the component to the assembly area 116 and complies with the production line requirements. The delivery tube may be twisted, e.g., forming multiple bends with different radii. The delivery tube may further be split or branched, i.e., including one or more junctions.

The term "feeder device", as used herein refers to a device configured to orient and feed individual components for assembly on automated production lines. For example, the feeder device may be used when a randomly sorted bulk package of components must be fed into another machine one-by-one, oriented in a particular direction. The feeder device may include or be connected to a package or storage container. The package may include components, such as, a plurality of fasteners 103 in a loose or ordered form. The feeder device may also be configured to release selected components, such as, e.g., fasteners, from the package into the delivery tube. For example, the components may be mounted on a carrier tape from which they are individually extracted and fed into the delivery tube. Non-limiting examples of suitable feeder devices include a vibrational bowl feeder, a centrifugal feeder, and a flexible feeder.

Setting tool 117 may be configured to directly receive fastener 103 delivered through delivery tube 105. Alternatively, the setting tool may include a transfer station that is disposed between the delivery tube and a nose of the setting tool. The fastener may stop at the transfer station and be transferred by a pusher into the nose. The nose may be a portion of the setting tool with an opening. The nose may be located at an end of the setting tool.

At least one sensor 107 may be positioned in proximity to both first point 109 and second point 111. When system 107 includes two sensors 127a and 127b, sensor 127a may be positioned in proximity to first point 109 and sensor 127b may be positioned in proximity to second point 111.

Preferably, sensor 107 is a non-contact sensor, i.e., a sensor that does not require a physical contact between the component, such as fastener 103, and any part of the sensor.

The sensor may be attached to the outer surface of the delivery tube, positioned near or in proximity to the outer surface of the delivery tube or positioned within the delivery tube. When positioned within the delivery tube, the thickness of the senor should be sufficiently small such that it does not interfere with the fastener movement. The sensors that are attached to the surface of the delivery tube may conform to the shape of the surface.

Sensor 127a may be positioned in proximity to the outer surface of delivery tube 105 and in proximity to first point 109. For example, sensor 127a and first point 109 may be positioned on a same plane that is normal to a longitudinal axis of delivery tube 105. Likewise, sensor 127b may be positioned in proximity to the outer surface of delivery tube 105 and in proximity to second point 111. For example, sensor 127b and second point 111 may be positioned on a same plane that is normal to a longitudinal axis of delivery tube 105.

It is to be understood that first point 109 and second point 111 should not necessarily be physically present, such as explicitly marked upon or within the tube. The term "first point " and "second point" may refer to projected points where the fastener is detected by the at least one sensor. The position of the first point and the second point may therefore depend on the position and detection mechanism of the at least one sensor.

Figure 1C:
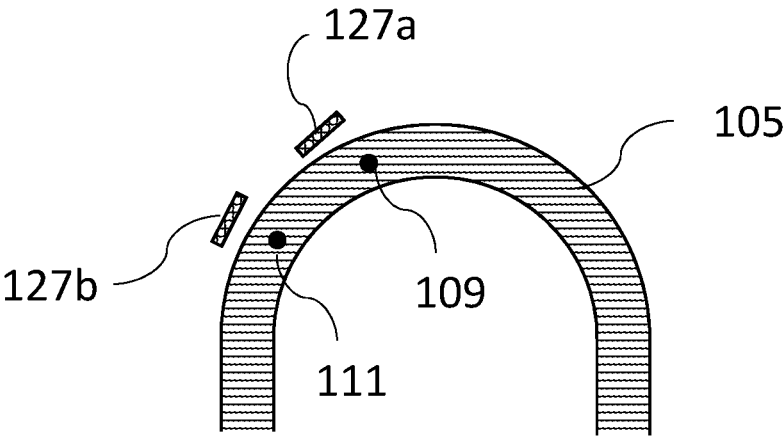
FIGS. 1C-1F schematically illustrate a region of a system for monitoring a fastener moving in a delivery tube, which includes two sensors, in accordance with some embodiments of the invention.
Figure 1D:
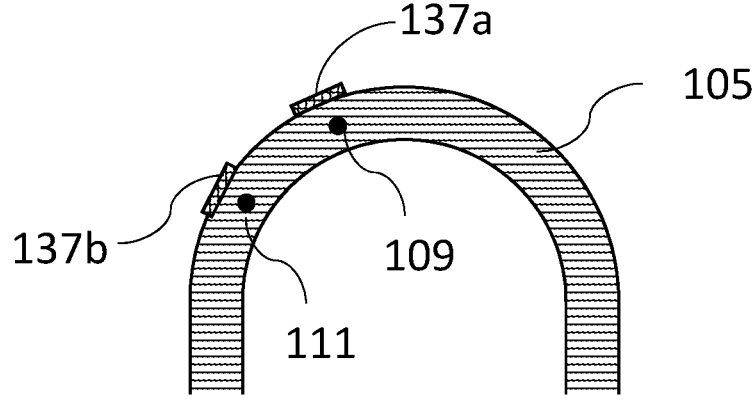
Figure 1E:
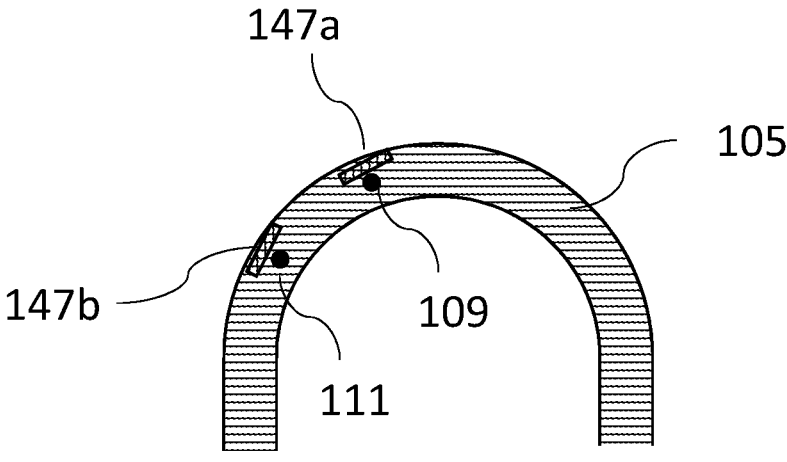

FIG. 1A shows sensor 107 that is positioned in proximity to the outer surface of delivery tube 105 and between first point 109 and second point 111. FIG. 1C shows sensors 127a and 127b that are positioned in proximity to the outer surface of delivery tube 105, wherein sensor 127a is positioned in proximity to first point 109 and second sensor 127b is positioned in proximity to second point 111. FIG. 1D shows sensors 137a and 137b that are attached to the outer surface of delivery tube 105, wherein sensor 137a is positioned in proximity to first point 109 and second sensor 137b is positioned in proximity to second point 111. FIG. 1E shows sensors 147a and 147b that are attached to the inner surface of delivery tube 105, wherein sensor 147a is positioned in proximity to first point 109 and second sensor 147b is positioned in proximity to second point 111.

The at least one sensor of the monitoring system may be a position sensor. The term "position sensor", as used herein, refers to a device configured to detect a component that moves through a certain point within the delivery tube and to transmit an electric readable signal to the controller upon detecting the component.

The at least one sensor may be configured to send a first signal to the controller when the component passes through the first point and to send a second signal to the controller when the component passes through the second point. For example, sensor 107 may be triggered by the passage of fastener 103 through first point 109 to send a first signal to controller 113 and by the passage of fastener 103 through second point 111 to send a second signal to controller 113. Alternatively, sensor 107 may continuously send a signal to controller 113, wherein the passage of fastener 107 through first point 109 and through second point 111 is configured to change at least one parameter of the signal. For example, an amplitude, frequency or a waveform of the signal may be changed upon the detection of fastener 103 passage through first point 109 and second point 111 by sensor 107. The signal may be an electric signal.

Likewise, each one of sensors 127a, 137a, and 147a may be triggered by the passage of fastener 103 through first point 109 to send a first signal to controller 113 and each one of sensors 127b, 137b, and 147b may be by the passage of fastener 103 through second point 111 to send a second signal to controller 113. Alternatively, each one of sensors 127a, 137a, and 147a may continuously send a signal to controller 113, wherein the passage of fastener 103 through first point 109 is configured to induce a first change in at least one parameter of the signal. Each one of sensors 127b, 137b, and 147b may continuously send a signal to controller 113, wherein the passage of fastener 103 through second point 111 is configured to induce a second change in at least one parameter of the signal.

The term "signal" as used herein, is therefore meant to encompass a discrete signal, as well as a change in at least one parameter of a continuous signal.

The sensor may be, for example, a proximity sensor or a motion sensor. The term "proximity sensor" as used herein, refers to a sensor capable of detecting the presence of nearby objects and generating an electric signal in response thereto. The proximity sensor may be based on optical (e.g., reflective or passive), capacitive, magnetic, ultrasonic, or thermal (e.g., infrared) sensing. The proximity sensor may be calibrated to provide a positive signal if an object is within a predetermined distance of the sensor, such as, 5 mm or less of the sensor.

The term "motion sensor", as used herein, refers to a sensor or component capable of sensing motion of any kind by an object within an active zone, such as area or volume.

Non-limiting examples of suitable sensors include an optical position sensor, inductive position sensor, Eddy current-based position sensor, capacitive position sensor, Hall effect-based magnetic position sensor, fiber-optic position sensor, thermal position sensor, and ultrasonic position sensor.

In some embodiments, the sensor is an optical position sensor. The main principle of optical sensor operation is the transmission or reception of light, wherein the sensor typically includes an emitter to provide a beam of light that is blocked or reflected by the target object which crosses the beam and a detector that is configured to detect if the light was interrupted or reflected by the object. The term "optical position sensor" is meant to encompass sensors operating in the visible light range, as well as in the infrared and ultraviolet regions. The term "optical position sensor" is further meant to encompass laser sensors. Non-limiting examples of suitable optical position sensors include a phototransistor, infrared light emitting diode, transmission type photointerruptor and reflective type photointerruptor. In some related embodiments, the delivery tube is transparent.

The at least one sensor may be selected, inter alia, based on the type of the component moving in the delivery tube. For example, sensors which detection is based on magnetic field can be used with components made of a ferromagnetic metal or metal alloy. Optical sensors should preferably be used with components that are opaque.

System 101 is suitable for monitoring various types of fasteners such as but not limited to screws, bolts, studs, rivets, slugs, and latches. The type of the fastener to be used is selected according to many factors including the type and the size of the parts to be connected. Fastener 103 may be made of any suitable material, as known in the art, such as metal, metal alloy, plastic, and ceramics.

The position of first point 109 and second point 111 along delivery tube 105, including the distance between first point 109 and second point 111, may be selected such that it allows to obtain two distinct (i.e., time-resolved) signals from the at least one sensor. In other words, controller 113 should preferably receive a first signal (or detect a first change in at least one parameter of the signal) when fastener 103 passes through first point 109 and receive a second signal (or detect a second change in at least one parameter of the signal) at a time interval that allows the controller to process such information. In some embodiments, the distance between the first point and the second point is larger than the size of the component in it largest dimension. In some embodiments, the distance between the first point and the second point corresponds to the time interval between the first signal and the second signal that is larger than the response time of the at least one sensor.

Figure 1F:
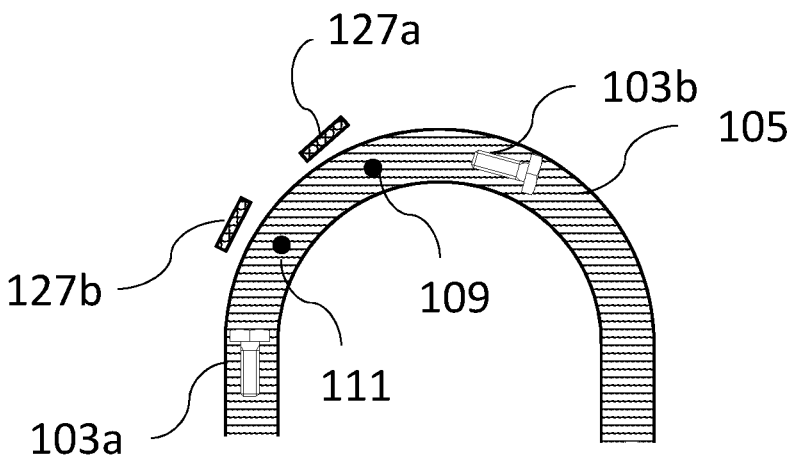

The delivery tube may be designed to accommodate a plurality of components that simultaneously move therethrough (e.g., each component being at a different part of the tube at the same time that other components are moving through the tube). For example, the tube may be long enough such that two, three, five or more components move therethrough, while each component is present at a different location depending on the time it entered the tube. For example, the plurality components may move through the tube in series with one another. The position of the first point and the second point along delivery tube may be selected to allow enough time between detection of two consecutive components. FIG. 1F shows a section of delivery tube 105 through which two consecutive fasteners 103a and 103b are passing. First point 109 and second point 111 may be positioned such that fastener 103a passes through second point 111 before fastener 103b reaches first point 109. Accordingly, in some embodiments, the distance between the first point and the second point is smaller than the distance between two consecutive components that move through the delivery tube.

If the velocity of the fastener is constant along the entire length of the delivery tube, the location of the detection points should not affect the velocity determination directly, as long as the distance between the detection points can be accurately measured. However, if certain regions along the delivery tube have different velocities (e.g., near the tube inlet, outlet or at tortuous regions), this information should be considered when determining the velocity. For example, the position of first point 109 and second point 111 along delivery tube 105 may further be selected to provide a segment between the points through which the fastener may move at an essentially constant velocity. For example, positioning of the first point and the second point closer to the delivery tube middle part and further from its inlet (where the fastener may still be accelerating) and from its outlet (where the fastener may be slowing down). The first point and the second point may further be positioned within an essentially linear section of the delivery tube to avoid fastener slowdown that may occur in a curved or twisted passage. Furthermore, the first point and the second point may be positioned at a certain distance from the delivery tube outlet to allow enough time for the controller to process the signals and perform further operation steps if needed, based on the calculated velocity.

In some embodiments, the first point, the second point or both are located at a distance of at least about 10% of the length of the delivery tube from the inlet of the delivery tube. In some embodiments, the first point, the second point or both are located at a distance of at least about 20% of the length of the delivery tube from the outlet of the delivery tube. In further embodiments, the first point, the second point or both are located at a distance of at least about 30%, at least about 40%, at least about 50%, or at least about 70% of the length of the delivery tube from the outlet of the delivery tube.

In some embodiments, the first point, the second point or both are located at a distance of at least about 10% of the length of the delivery tube from the feeder device. In some embodiments, the first point, the second point or both are located at a distance of at least about 20% of the length of the delivery tube from the assembly area. In further embodiments, the first point, the second point or both are located at a distance of at least about 30%, at least about 40%, at least about 50%, or at least about 70% of the length of the delivery tube from the assembly area.

The system may include more than two points at which the component is detected by the at least one sensor to detect the component at more than two points along the delivery tube. For example, the system may include at least one sensor configured to detect the component when it passes through the first point, through the second point, and a third point, within the delivery tube. The system may include the first sensor configured to detect the component when it passes through the first point, the second sensor configured to detect the component when it passes through the second point, and a third sensor configured to detect the component when it passes through the third point. The third point may be located before the first point, beyond the second point, or between the first point and the second point. Detecting the fasteners at more than two points may increase accuracy of velocity determination, as velocity may be calculated by measuring the time required for the component to pass between the first point and the second point, between the second point and the third point, and/or between the first point and the third point. After determining the velocity based on the measured time and known distances between the three points, an average velocity may be calculated. If any velocity fluctuations exist along the delivery tube or as a function of time or operating conditions within the tube, using more than two points (such as, three, four, five or more points), may be beneficial for increasing accuracy of the velocity determination.

The controller suitable for use in the system and method of the present invention may be configured to execute an algorithm configured to automatically carry out various steps in the operation of the controller. The controller may further include a readable memory such as a digital memory or the like for storing data (e.g. parameters and/or commands, for example, a code for implementing the algorithm). Additionally, the controller may include and/or execute a machine learning algorithm configured to process and analyze the stored data.

The controller may be configured to determine a time interval between the first signal and the second signal and to determine a velocity of the component based on the time interval and a distance between the first point and the second point. The operation steps may be performed by the algorithm. In one example, controller 113 is configured to measure the time interval between the detection of fastener 103 by sensor 107 when it passes through first point 109 and the detection of fastener 103 by sensor 107 when it passes through second point 111. In another example, controller 113 is configured to measure the time interval between the detection of fastener 103 by sensor 127a when it passes through first point 109 and the detection of fastener 103 by sensor 127b when it passes through second point 111.

The at least one sensor may be operatively coupled to a time monitoring system that is configured to record the first signal and the second signal as a function of time. Such time monitoring system may be further operatively coupled to the controller. As such, the controller may calculate the time interval between the detection of the component when it passes through the first point and the detection of the component when it passes through the second point.

Additionally or alternatively, the controller may include the time monitoring system that is configured to record the first signal and the second signal as a function of time. As such, the controller may calculate the time interval between the detection of the component when it passes through the first point and the detection of the component when it passes through the second point.

When more than two detection points and/or more than two sensors are used for determining the velocity, the controller may be configured to record the signals of each sensor as a function of time. The controller may further be configured to calculate the time interval between the detection of the component at each two detection points or by each two sensors.

The controller may further be configured to calculate the velocity by dividing the distance between the first point and the second point by the measured time interval to obtain the velocity. When the system includes two sensors, and when the position of the first sensor coincides with the position of the first point, and the position of the second sensor coincides with the position of the second point along the plane normal to the longitudinal axis of the delivery tube, the controller may be configured to calculate the velocity by dividing the distance between the first sensor and the second sensor by the measured time interval.

As explained hereinabove, more than two detection points or more than two sensors may be used, e.g., to increase accuracy of the velocity measurement. In certain such embodiments, an average velocity may be calculated. For example, a set of velocities may be determined based on the time intervals measured between each two detection points or between each two sensors and the respective distances between the two detection points or the two sensors. The average velocity may then be calculated based on the set of velocities.

The controller may be further configured to compare the calculated velocity to a predefined velocity range. The terms "predefined velocity range" and "normal velocity range" that are used herein interchangeably, refer to a range of velocities that are characteristic of a normal component that moves in the delivery tube at predefined operating conditions.

The term "normal component", as used herein, refers to a component designated for use at the assembly area, wherein the assembly area may include an assembly device, which is configured to connect the component to one or more additional components of the intended product.

Movement of the component within the delivery tube may be induced by positive or negative pressure within the tube. Velocity of the component may depend on the pressure. The pressure may be adjusted to obtain the desired velocity of a normal component. Accordingly, the terms "predefined velocity range" and "normal velocity range" may refer to a range of velocities that are characteristic of a normal component that moves in the delivery tube under a predefined pressure.

The terms "predefined operating conditions" and "optimal operating conditions" that are used herein interchangeably, refer to operating conditions configured to be employed within the feed system at the time the component moves through the delivery tube.

If the calculated velocity is outside of the predefined velocity range, this may be due to the component not being a normal component or the operating conditions being different from the predefined operating conditions. For example, the component may be incompatible with the assembly device and/or a workpiece to which the component is configured to be attached, due to a different size, shape or material. The component that is not a normal component is termed herein a "defective" or "faulty" component. The faulty component may be of the same type as the normal component but having a quality defect or being of a different, unsuitable type. Additionally or alternatively, the pressure within the delivery tube may be different from the predefined pressure, as for example it may uncontrollably increase or decrease during the automated production process, thereby resulting in the measured velocity being different than the predefined velocity range.

It is to be understood that the term "measured velocity", as used herein, refers to the calculated velocity, wherein in practice, time is measured and not the velocity itself.

The controller may include a readable memory for storing data. The stored data may be used to compile a database including different sorts of information. For example, the controller may be configured to store data of previously calculated velocities of components that move through the delivery tube during the automated manufacturing process. Additionally or alternatively, a set of tests may be performed specifically to obtain empiric data of component velocities. The velocity of the component may depend, inter alia, on the system parameters and/or operating or measurement conditions. The particular system parameters may include the component type, types of sensors, and/or types of hardware, wherein the hardware includes delivery tube and feeder device. For example, the different hardware parameters may include a diameter of the delivery tube or a mechanism used to propel the component. The operating or measurement conditions may include pressure within the delivery tube and/or positions of the detection points or sensors. The stored data may include calculated velocities acquired at the different system parameters and/or operating or measurement conditions.

For example, the stored data may include calculated velocities of the same type or different types of components. The stored data may further include calculated velocities of components that move in the delivery tube at different pressures. The stored data may further include calculated velocities, wherein the velocities are calculated based on the different positions of the first point and the second point. The stored data may further include calculated velocities that are obtained by using different types of sensors. The stored data may be hardware-specific (in other words, being collected when using a certain type of hardware, including the sensors, delivery tube and feeder device) and suitable for use only with the same hardware. Alternatively, the stored data may contain sets of data for different types of the hardware.

The controller may further include a machine learning algorithm configured to analyze the stored data. The controller may be configured to analyze a database containing the one or more of the above listed types or stored data using the machine learning algorithm to derive one or more predefined velocity range. It is to be understood that a set of predefined velocity ranges may be compiled, each range being dependent on the particular system parameters and/or operating or measurement conditions, as detailed hereabove. Accordingly, for each combination of parameters, a specific predefined velocity range may be obtained. Acquiring the predefined velocity range may be referred to as performing a calibration of the monitoring system.

When comparing the calculated velocity with the predefined velocity range, the controller may select the predefined velocity range from the set of predefined velocity ranges that matches the system parameters and the operating or measurement conditions of the presently monitored type of component. In other words, while the parameters of the system in which the component is configured to be monitored in-situ need to be identical to the system that was used to derive the normal velocity range, other parameters, such as pressure and position of points may be altered as long as their effect on the velocity may be determined. For example, a set of predefined velocity ranges may be produced for different pressures and the pressure within the delivery tube may be measured at the time of the in-situ component monitoring and the calculated velocity may be compared with the velocity range corresponding to the same pressure. Alternatively, an effect of the operating or monitoring conditions on the velocity may be estimated and included in the calculation of the component velocity, even when the calculated velocity and the predefined velocity range do not correspond to the same operating or monitoring conditions.

Additionally, when using different detection points and when the velocity of the component is essentially constant throughout the delivery tube, the predefined velocity range may include an average of the velocities calculated based on different positions of the detection points.

Using different detection points may further be useful to establish regions within the delivery tube where the component velocity is constant by comparing velocities measured at different regions. The regions where the measured velocities are essentially the same may be used to position the detection points during the in-situ monitoring of the component velocity, while regions in which the velocity is different may be avoided.

In some embodiments, the controller is configured to analyze the database of measured velocities of a plurality of identical components moving in the delivery tube, using the machine learning algorithm to derive the predefined velocity range, wherein the monitored component moving in the production line is of the same type as the identical components.

The term "of the same type", as used herein, means components that are supposed to be identical but may erroneously be different.

The stored data may further include calculated velocities, wherein the monitoring system or method include more than two detection points or more than two sensors. As explained hereinabove, using more than two detection points and/or more than two sensors may increase the accuracy of the velocity determination, and as such, also of the predefined velocity range. In certain such embodiments, the stored data may include average velocities measured from the different pairs of detection points and/or different pairs of sensors.

It is to be understood that the present monitoring method and system may not require calculating the component velocity. If the same detection points are used (or if the distance between the detection points is identical even when different detection points are used and the velocity throughout the delivery tube is essentially constant), the measured time interval may be used instead of the calculated velocity. Accordingly, referring to a velocity or predefined velocity range also encompasses the time interval for passage of the component between the first point and the second point, wherein the distance between the first point and the second point is identical for the components measured in-situ and the components from the database, wherein the time of passage is compared to a predefined time of passage range, derived from the database.

The predefined velocity range may further be obtained by a theoretical model calculation for establishing a velocity of a normal component, taking into account the parameters of the component, the parameters of the feed system, such as a length and inner diameter of the delivery tube, and operating conditions, such as pressure within the delivery tube.

The monitoring system or the controller may be configured to perform various operation steps once the monitoring system detects one or more components which each have a velocity outside of the predefined velocity range, i.e., that is higher than the upper limit of the range or lower than the lower limit of the range. For example, the controller may be configured to control means for providing an alert. The means for providing the alert may be configured to alert a technician about one or more components which each have a velocity outside of the predefined velocity range. The monitoring system may include at least one indicator configured to alert a technician about one or more components which each have a velocity outside of the predefined velocity range. The at least one indicator may be a part of the controller. The at least one indicator may be selected from a visual indicator or an acoustic indicator. The visual indication may include, inter alia, a text or symbol projected on a screen, or a visual display, e.g., a light-emitting diode (LED) or organic light-emitting diode (OLED). The acoustic indicator may include a speaker that emits a sound, such as, a beeping sound, a buzzing sound, etc.

The controller may further be configured to provide information to the indicator (e.g., that may be used by a technician) about a number of components which each have a velocity outside of the predefined velocity range. For example, if the number of such components exceeds a certain threshold, this may be an indication of a defective batch of components, e.g., a batch of defective fasteners. The at least one indicator may therefore be configured to alert the technician about the number of components which exceeds the certain threshold and, optionally, provide instructions to replace the components within the storage container. The controller may further be configured to analyze the number of components which each have a velocity outside of the predefined velocity range out of a certain number of components that pass through the delivery tube to provide information on the quality of the components or batches of components. The number of components may be defined by a certain time interval (e.g., a certain number of components that each have a velocity outside of the velocity range within a time interval), consecutive components (e.g., a certain number of components that each have a velocity outside of the velocity one after another), etc.

The feed system or the monitoring system may further include a gas pressure detector or gas flow rate detector and means for adjusting the pressure to control the pressure within the delivery tube to avoid pressure fluctuations, to thereby eliminate the effect of such pressure fluctuations on the measured component velocity.

Figure 2:
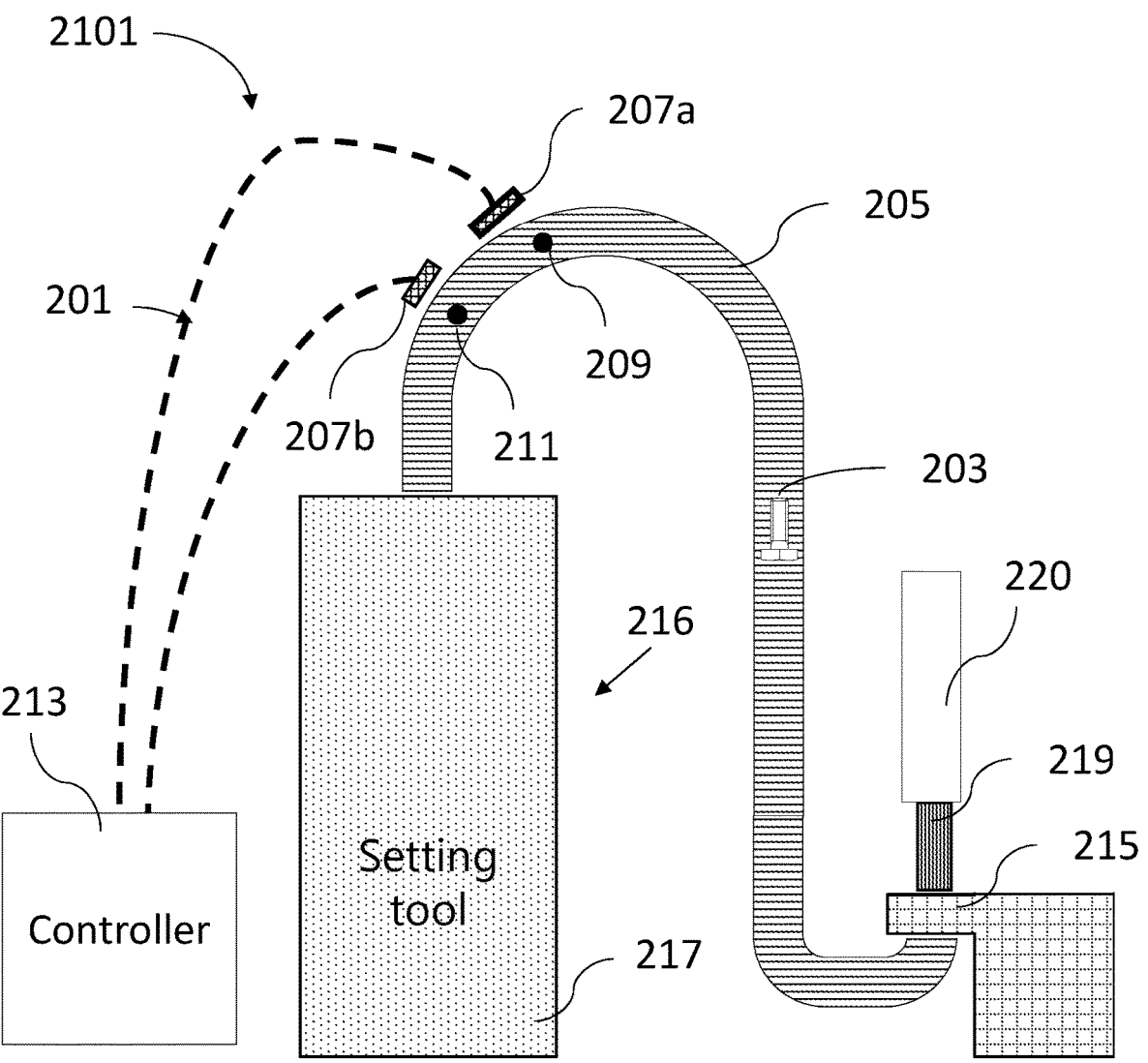
FIG. 2 schematically illustrates a system for monitoring a fastener moving in a delivery tube, including a pressure regulator, in accordance with some embodiments of the invention.

Reference is now made to FIG. 2, which schematically illustrates feed system 2101 including monitoring system 201. Fastener 203 moves through delivery tube 205 of feed system 2101. Monitoring system 201 includes first sensor 207a positioned in proximity to first point 209 and configured to detect fastener 203 when it passes through first point 209 and second sensor 207b positioned in proximity to second point 211 and configured to detect fastener 203 when it passes through second point 211 within delivery tube 205. Monitoring system 201 further includes controller 213 that is operatively coupled to first sensor 207a and second sensor 207b. Feed system 2101 includes feeder device 215 and delivery tube 205 that is connected to setting tool 217.

Feed system 2101 further includes a pressure source 220 that is operatively coupled to delivery tube 205. The pressure source 220 may be configured to establish a positive or negative pressure within delivery tube 205. The pressure within delivery tube 205 may be controlled by pressure regulator 219. Pressure regulator 219 may be a part of monitoring system 201 or feed system 2101. It is important however that pressure regulator 219 be operatively coupled to controller 213. The pressure source 220 may be provided by a pump that may receive air or another gas at atmospheric pressure and form a vacuum or pressure source. In some embodiments, the pressure source 220 includes a source of compressed air. In some related embodiments, the pressure source 220 is configured to establish a positive pressure within delivery tube 205. Pressure regulator 219 may be configured to control pressure or flow rate of air within delivery tube 205. Pressure regulator 219 may include a pressure or flow rate detector.

The controller may be configured to adjust operating conditions within the delivery tube. For example, controller 213 may be configured to activate pressure regulator 219 to alter the positive or negative pressure within delivery tube upon detection of one or more fasteners 203 which each have a velocity outside of the predefined velocity range.

The difference between faulty components and normal components which each have a velocity outside of the predefined velocity range due to non-optimal operating conditions, e.g., the pressure within the delivery tube, may be established based on the number of consecutive components, which each have a velocity outside of the predefined velocity range. While appearance of a defective component within a batch of fasteners may be random, a change in pressure may affect a number of consecutive components within the delivery tube. Accordingly, detecting a single component which has a velocity outside of the predefined velocity range or a number of such individual components which appear in the tube sporadically may indicate a defective component, while detecting a number of consecutive components each having a velocity that is outside of the predefined velocity range may signify non-optimal operating conditions.

In some embodiments, the controller is configured to activate the pressure regulator to alter the positive or negative pressure within the delivery tube upon detection of two or more consecutive components which each have a velocity outside of the predefined velocity range. In some embodiments, the controller is configured to activate the pressure regulator to alter the positive or negative pressure within the delivery tube upon detection of more than about 20 consecutive components which each have a velocity outside of the predefined velocity range, more than about 15 consecutive components, more than about 10 consecutive components, or more than about 5 consecutive components.

The difference between the faulty components and normal components which each have a velocity outside of the predefined velocity range due to non-optimal operating conditions, may further be established based on an extent of the variance between the calculated velocity and the predefined velocity range. For example, the extent of variance upon the detection of a defective component may be significantly higher than upon detection of non-optimal operating conditions or vice versa. Furthermore the machine learning algorithm of the controller may be trained to distinguish between the faulty components and normal components which each have a velocity outside of the predefined velocity range due to non-optimal operating conditions, e.g., by analyzing the various databases as disclosed hereinabove. Non-limiting examples of suitable algorithms include random forest (RF) clustering, Ward's minimum variance method, discriminant function analysis (DFA), artificial neural network (ANN) algorithm, support vector machine (SVM), principal component analysis (PCA), Multilayer perceptron (MLP), generalized regression neural network (GRNN), fuzzy inference system (FIS), self-organizing map (SOM), radial basis function (RBF), genetic algorithm (GA), neuro-fuzzy system (NFS), adaptive resonance theory (ART), partial least squares (PLS), multiple linear regression (MLR), principal component regression (PCR), linear discriminant analysis (LDA), cluster analysis, Fisher linear discriminant analysis (FLDA), Soft independent modeling by class analogy (SIMCA), K-nearest neighbors (KNN), fuzzy logic algorithms, and canonical discriminant analysis (CDA).

The controller may be configured to activate the pressure regulator to alter the positive or negative pressure within the delivery tube upon detection of one or more components having velocity outside of the predefined velocity range after the one or more components have been examined and determined to not be defective. For example, the technician may examine the components and confirm that the components are not defective. In some examples, the examination and/or determination may be performed automatically using automated processes and devices that may be configured to measure or determine weight, shape, material, etc., These devices may be part of the controller or configured to communicate with the controller.

The pressure regulator may alter the positive or negative pressure such that one or more components that move within the delivery tube after the component which has a velocity found to be outside of the predefined velocity range each have a velocity that is within the predefined velocity range. Pressure adjustment may be induced by the controller. For example, controller 213 may be configured to analyze a database of measured velocities of a plurality of identical fasteners 203 moving in delivery tube 205 at different pressures, using a machine learning algorithm to provide a correlation between the velocity of the fastener and the pressure within delivery tube 205. Such correlation may be generated for different types of fasteners, wherein for each correlation a database containing a plurality of identical fasteners of the same type is used. An extent to which the pressure is altered by pressure regulator may be based on the correlation. It is to be understood that the fastener which has a velocity monitored and found to be outside of the predefined velocity range should be of the same type as the fasteners used for obtaining the correlation between fastener velocity and pressure.

The controller may further be configured to prevent delivery of defective components to the assembly area 216. For example, the controller may be configured to divert the component from its route towards the assembly device if the velocity of the component is found to be outside of the predefined velocity range.

Figure 3:
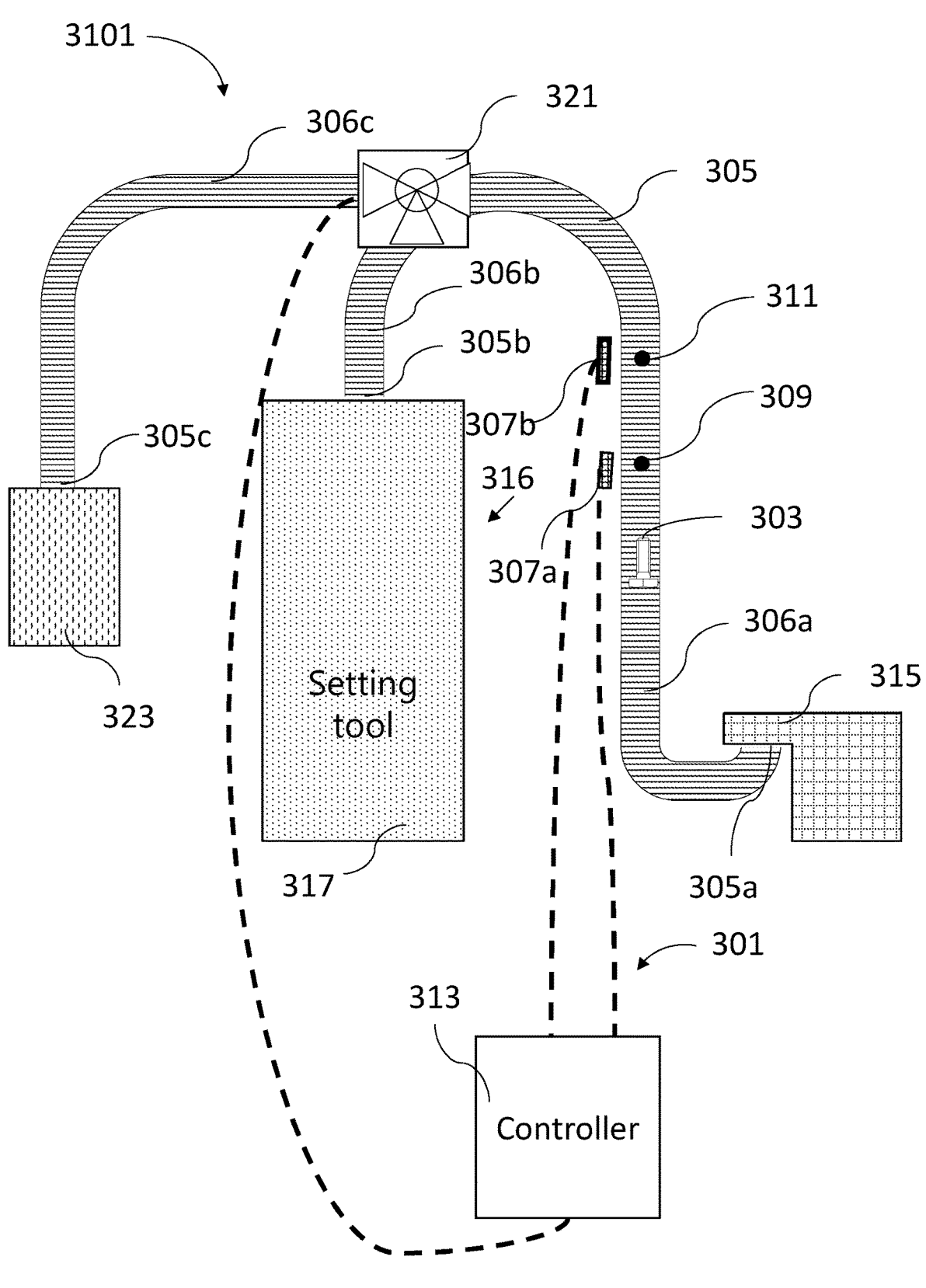
FIG. 3 schematically illustrates a system for monitoring a fastener moving in a delivery tube, including a split delivery tube for diverging a faulty fastener, and a fastener disposal container, in accordance with some embodiments of the invention.

Reference is now made to FIG. 3, which schematically illustrates feed system 3101 including monitoring system 301. Fastener 303 moves through delivery tube 305 of feed system 3101. Monitoring system 301 includes first sensor 307a positioned in proximity to first point 309 and configured to detect fastener 303 when it passes through first point 309 and second sensor 307b positioned in proximity to second point 311 and configured to detect fastener 303 when it passes through second point 311 within delivery tube 305. Monitoring system 301 further includes controller 313 that is operatively coupled to first sensor 307a and second sensor 307b. Feed system 3101 includes feeder device 315 and delivery tube 305 that interconnects feeder device 315 to setting tool 317 of the assembly area 316. Delivery tube 305 includes inlet 305a that is connected to feeder device 315, first outlet 305b that is connected to setting tool 317, and second outlet 305c that is connected to disposal container 323. Disposal container 323 may be configured for storing fasteners which each have a velocity found to be outside of the predefined velocity range.

Monitoring system 301 may be configured to allow passage of fastener 303 from inlet 305a to first outlet 305b when the velocity is within the predefined velocity range. Monitoring system 301 may be configured to prevent passage of fastener 303 from inlet 305a to first outlet 305b when the velocity is outside of the predefined velocity range. For example, controller 313 may be configured to redirect fastener 303 to second outlet 305c if its velocity is outside of the predefined velocity range.

In order to enable fastener redirection, the delivery tube may include a junction and/or be a split tube. The system may include a valve. The valve may be, for example, a three-way valve. The valve may be operated by the controller. Preferably, the valve is an electromagnetic valve, such as a solenoid valve. The valve may control the passage of the component through the junction. For example, the passage to the assembly area may generally remain open and get closed only when the measured velocity is outside of the predefined velocity range, thereby preventing passage of the faulty component to the assembly area. In some embodiments, when the passage to the assembly area gets closed, a passage to a disposal container gets opened, allowing passage of the faulty component thereto when the measured velocity is outside of the predefined velocity range. The control over the junction may be preformed by means of the valve that is operated by the controller.

For example, delivery tube 305 includes first segment 306a, second segment 306b, and third segment 306c. System 3101 further includes three-way valve 321 that is located along delivery tube 305. First segment 306a extends between inlet 305a and three-way valve 321. Second segment 306b extends between three-way valve 321 and first outlet 305b. Third segment 306c extends between three-way valve 321 and second outlet 305c. Three-way valve 321 connects first segment 306a, second segment 306b, and third segment 306c, thereby interconnecting inlet 305a with first outlet 305b and second outlet 305c. Three-way valve 321 may be operatively coupled to controller 313.

First sensor 307a and second sensor 307b are located along first segment 306a. Normally, the passage through first segment 306a and second segment 306b should remain open and the passage through third segment 306c should remained closed. In such configuration, fastener 303 is transferred from feeder device 315 to setting tool 317. Controller 313 may be configured to redirect fastener 303 by actuating three-way valve 321. For example, when the calculated velocity is outside of the predefined velocity range, controller 313 may send a signal to three-way valve 321 to close the passage through second segment 306b and to open a passage through third segment 306c. In such case, fastener 303 is transferred from feeder device 315 to fastener disposal container 323. Preferably, a distance between second sensor 307b and three-way valve 321 should be large enough to allow sufficient time for the controller to calculate the velocity of the fastener that moves through first segment 306a of delivery tube 305 and to send the signal three-way valve 321 if the calculated velocity is outside of the predefined velocity range.

Monitoring system 301 may further include a pressure regulator as described in relation to FIG. 2. The pressure regulator may be used for adjusting the pressure within delivery tube 305 upon detection of two or more consecutive fasteners which each have a velocity outside of the predefined velocity range. The pressure regulator may be further used for adjusting the pressure within delivery tube 305 upon detection of one or more fasteners which each have a velocity outside of the predefined velocity range. Controller 313 may be configured to activate the pressure regulator to alter the pressure within delivery tube 305 after an examination and determination that the components are normal and not defective. For example, after the technician examines the one or more fasteners and if upon examination the fasteners are found to be normal. In some examples, the examination and/or determination may be performed automatically using automated processes and devices that may be configured to measure or determine weight, shape, material, etc. These devices may be part of the controller or configured to communicate with the controller.

The controller may further be configured to detect a time interval between a second signal of a first component moving in the delivery tube and a first signal of a second component moving in the delivery tube, wherein the second component is subsequent to the first component. The time interval may be compared to a predefined time interval range. If the measured time interval is different from the predefined time interval range, i.e., is smaller than the lower limit or larger than the upper limit, the monitoring system may be configured to perform the same operation steps as when the calculated velocity is outside of the predefined velocity range, as described in detail hereinabove. For example, a smaller time interval may signal about a potential jam in an assembly device, wherein the components arrive to the assembly device too fast, while a larger time interval may serve an indication of an inefficient process, wherein the delivery of components to the assembly device is too slow.

Reference is now made to FIG. 4A which schematically illustrates steps of a method for monitoring and/or controlling a component moving in a delivery tube, in accordance with some aspects and embodiments of the invention.

Step 401 includes determining a velocity of a component that moves through a delivery tube. The velocity of the component may be determined by determining a time interval during which the component moves between a first point and a second point within the delivery tube. The time interval may be determined by detecting a first time associated with the component passing through the first point and a second time associated with the component passing through the second point. The first time, the second time or both may be detected by at least one sensor operatively coupled to a controller. The controller may receive a first signal from the at least one sensor when the component passes through the first point, thereby detecting the first time and a second signal from the at least one sensor when the component passes through the second point, thereby detecting the second time. In some examples, the component passing through may change at least one parameter of a continuous signal.

In some embodiments, the first time is detected by a first sensor located in proximity to the first point and the second time is detected by a second sensor located in proximity to the second point, wherein both the first sensor and the second sensor are operatively coupled to the controller. The controller may receive a first signal from the first sensor when the component passes through the first point and a second signal from the second sensor when the component passes through the second point. The first sensor and the second sensor may be connected to a time monitoring system that is configured to record the first signal and the second signal as a function of time. The controller may include the time monitoring system. Accordingly, the controller may detect the first time when it receives the first signal and the second time when it receives the second signal, wherein the first time and the second time correspond to the same timescale.

The controller may further calculate a difference between the first time and the second time, thereby determining the time interval during which the component moves between the first point and the second point within the delivery tube. The controller may further determine the velocity based on the time interval and a distance between the first point and the second point, as explained in detail hereinabove.

Step 402 includes comparing the velocity to a predefined velocity range. As explained hereinabove, the predefined velocity range may be derived from a database of measured velocities of a plurality of various types of components moving in the delivery tube at various operating and measurement conditions and using a feed system having different parameters. The predefined velocity range may be derived using a machine learning algorithm. In some embodiments, the predefined velocity range is derived from a database of measured velocities of a plurality of identical components moving in the delivery tube, using a machine learning algorithm, wherein the monitored component is of the same type as the identical components.

Reference is now made to FIG. 4B which schematically illustrates the intermediate steps of the method described in FIG. 4A, in accordance with some embodiments of the invention. Step 411 includes detecting the first time that is associated with the component that passes through the first point. Step 412 includes detecting the second time that is associated with the component that passes through the second point. Step 413 includes determining a difference between the first time and the second time. Step 414 includes calculating the velocity.

The velocity is calculated based on the time difference as calculated in step 413 and a distance between the first point and the second point.

Step 421 that is preferably performed prior to step 411, includes analyzing previously calculated velocities of components that are identical to the component in steps 411-414. Step 422 includes deriving a predefined velocity range based on the analysis of step 421.

Step 431 includes comparing the velocity calculated in step 414 to the predefined velocity range determined in step 422.

Figure 5:
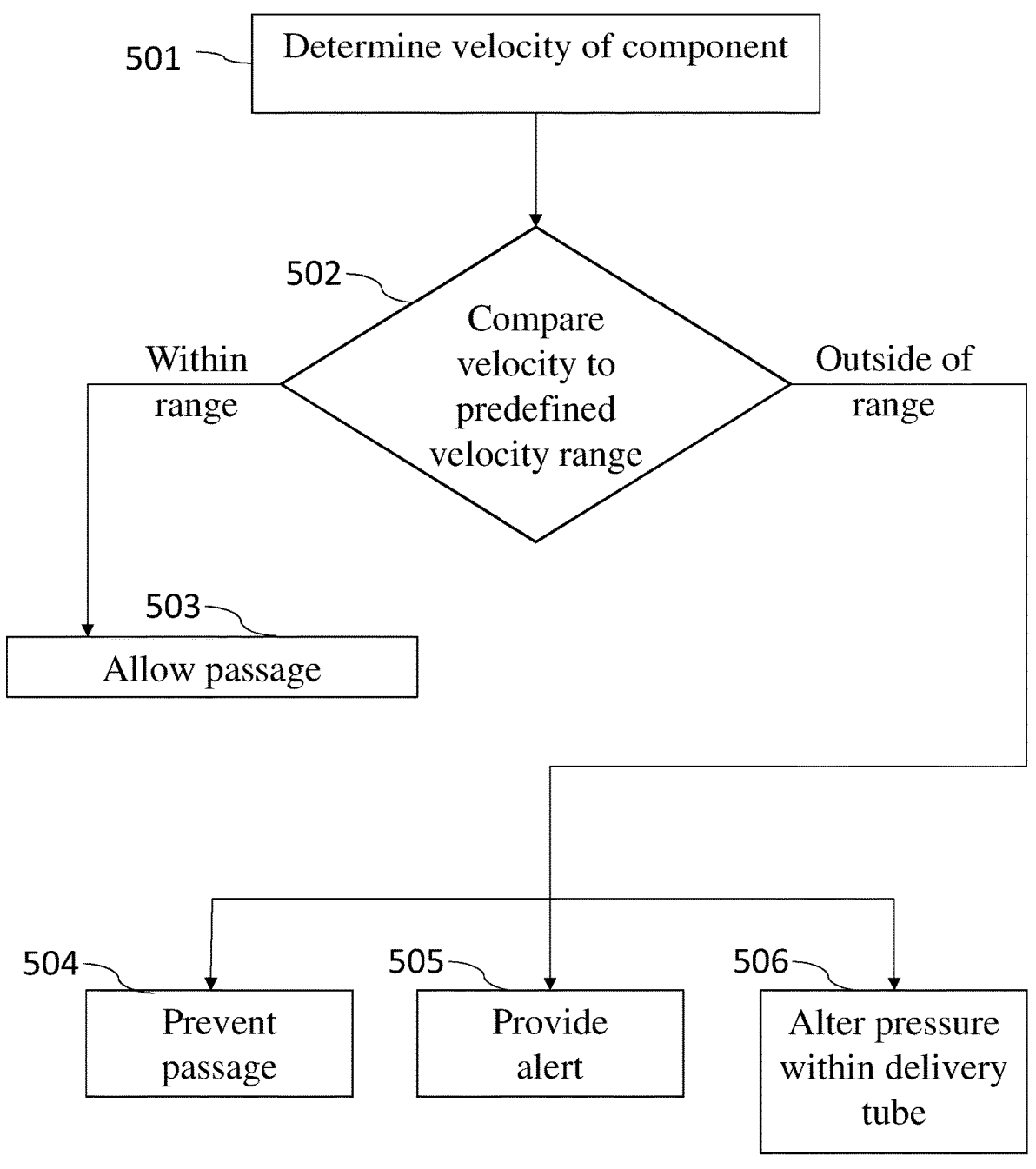

Reference is now made to FIG. 5, which schematically illustrates steps of a method for monitoring and/or controlling a component moving in a feed system, in accordance with some embodiments of the invention.

Step 501 includes determining a velocity of the component that moves through a delivery tube. Step 501 may be similar to step 401. Step 502 includes comparing the velocity to a predefined velocity range. Step 502 may be similar to step 402.

Step 503, that is performed if the velocity is within the predefined velocity range, includes allowing the component to reach the assembly area that may include an assembly device. In other words, no action needs to be taken if the velocity is within the predefined velocity range. If the velocity is outside of the predefined velocity range, one or more of steps 504-506 may be performed. Step 504 includes preventing the component from reaching the assembly area and/or the assembly device. For example, step 504 may include redirecting the component to a disposal container before it reaches the assembly device. Step 505 includes controlling means for providing an alert (e.g., for alerting a technician) about the component which has a velocity outside of the predefined velocity range. Step 506 includes altering a pressure within the delivery tube. Selection of the suitable step(s) may be performed by the controller, as discussed in detail hereinabove.

As used herein and in the appended claims the singular forms "a," "an," and "the" include plural references unless the content clearly dictates otherwise. Thus, for example, reference to "fastener" includes a plurality of such fasteners and equivalents thereof known to those skilled in the art, and so forth. It should be noted that the term "and" or the term "or" is generally employed in its sense including "and/or" unless the content clearly dictates otherwise.

As used herein, the terms "plurality" and "multiple" mean more than one.

As used herein, the term "about," when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed methods.

The present application also discloses the subject matter of the following clauses. Clause 1. A system for monitoring and/or controlling a component moving in a delivery tube, the system comprising:

at least one sensor configured to detect the component when the component passes through a first point and through a second point within the delivery tube; and
a controller,
wherein the at least one sensor is operatively coupled to the controller. Clause 2. The system of clause 1, comprising the delivery tube and a feeder device connected to the delivery tube.

Clause 3. The system of clause 2, wherein the delivery tube is configured to connect the feeder device to an assembly area.

Clause 4. The system of any one of clauses 1 to 3, wherein the at least one sensor is configured to send a first signal to the controller when the component passes through the first point and to send a second signal to the controller when the component passes through the second point.

Clause 5. The system of any one of clauses 1 to 4, wherein the at least one sensor comprises a position sensor.

Clause 6. The system of clause 5 wherein the position sensor comprises one or more of an optical position sensor, inductive position sensor, Eddy current-based position sensor, capacitive position sensor, Hall effect-based magnetic position sensor, fiber-optic position sensor, thermal position sensor, and ultrasonic position sensor.

Clause 7. The system of clause 6, wherein the position sensor is the optical position sensor. Clause 8. The system of any one of clauses 3 to 7, wherein the first point, the second point, or both are located at a distance of at least about 20% of the length of the delivery tube from an outlet of the delivery tube connected to the assembly area.

Clause 9. The system of any one of clauses 1 to 8, wherein the at least one sensor comprises a first sensor located in proximity to the first point and a second sensor located in proximity to the second point.

Clause 10. The system of clause 9, wherein the controller receives the first signal from the first sensor when the component passes through the first point and the second signal from the second sensor when the component passes through the second point.

Clause 11. The system of any one of clauses 4 to 10, wherein the at least one sensor is operatively coupled to a time monitoring system and wherein the controller is configured to record the first signal and the second signal as a function of time.

Clause 12. The system of clause 11, wherein the controller is configured to determine a time interval between the first signal and the second signal and to determine a velocity of the component based on the time interval and a distance between the first point and the second point.

Clause 13. The system of any one of clauses 1 to 12, wherein the controller is further configured to compare the velocity to a predefined velocity range.

Clause 14. The system of any one of clauses 1 to 13, wherein the controller comprises a readable memory for storing data and a machine learning algorithm configured to analyze the stored data.

Clause 15. The system of clause 14, wherein the controller is configured to analyze a database of measured velocities of a plurality of identical components moving in the delivery tube, using the machine learning algorithm to derive the predefined velocity range, wherein the monitored component is of the same type as the identical components.

Clause 16. The system of any one of clauses 3 to 15, wherein the delivery tube comprises an inlet that is connected to the feeder device, a first outlet that is connected to the assembly area, and a second outlet that is not connected to the assembly area.

Clause 17. The system of clause 16, wherein the controller is configured to allow passage of the component from the inlet to the first outlet when the velocity is within the predefined velocity range.

Clause 18. The system of any one of clauses 16 or 17, wherein the controller is configured to redirect a component which has a velocity outside of the predefined velocity range to the second outlet.

Clause 19. The system of any one of clauses 16 to 18, further comprising a valve that is located along the delivery tube and connects the inlet with the first outlet and the second outlet, wherein the valve is operatively coupled to the controller.

Clause 20. The system of clause 19, wherein the delivery tube is composed of a first segment extending between the inlet and the valve, a second segment extending between the valve and the first outlet, and a third segment extending between the valve and the second outlet.

Clause 21. The system of clause 20, wherein the at least one sensor is located along the first segment.

Clause 22. The system of any one of clauses 19 to 21, wherein the controller is configured to redirect the component by actuating the valve.

Clause 23. The system of any one of clauses 13 to 22, further comprising at least one indicator configured to alert a technician about a component which has a velocity outside of the predefined velocity range.

Clause 24. The system of any one of clauses 1 to 23, further comprising a pressure source configured to establish a positive or negative pressure within the delivery tube.

Clause 25. The system of clause 24, wherein the pressure source is operatively coupled to the delivery tube and controlled by a pressure regulator operatively coupled to the controller.

Clause 26. The system of clause 25, wherein the controller is configured to activate the pressure regulator to alter the pressure within the delivery tube upon detection of two or more consecutive components which each have a velocity outside of the predefined velocity range.

Clause 27. The system of clause 26, wherein the controller is configured to analyze a database of measured velocities of a plurality of identical components moving in the delivery tube at different pressures, using a machine learning algorithm, wherein the monitored component is of the same type as the identical components, to provide a correlation between the velocity of the component and the pressure within the delivery tube.

Clause 28. The system of clause 27, wherein an extent to which the pressure is altered is based on the correlation.

Clause 29. A method of monitoring/controlling a component moving in a delivery tube, the method comprising:

determining a velocity of the component that moves within the delivery tube; and comparing the velocity to a predefined velocity range.

Clause 30. The method of clause 29, wherein the delivery tube connects a feeder device to an assembly area.

Clause 31. The method of any one of clauses 29 or 30, wherein the velocity is determined by determining a time interval during which the component moves between a first point and a second point within the delivery tube.

Clause 32. The method of clause 31, wherein the time interval is determined by detecting a first time associated with the component passing through the first point and a second time associated with the component passing through the second point.

Clause 33. The method of clause 32, wherein the first time, the second time or both are detected by at least one sensor operatively coupled to a controller, and wherein the at least one sensor is operatively coupled to a time monitoring system.

Clause 34. The method of clause 33, wherein the at least one sensor comprises a first sensor and a second sensor.

Clause 35. The method of clause 34, wherein the first time is detected by the first sensor located in proximity to the first point and the second time is detected by a second sensor located in proximity to the second point.

Clause 36. The method of any one of clauses 33 to 35, wherein the controller receives a first signal from the at least one sensor when the component passes through the first point, thereby detecting the first time and a second signal from the at least one sensor when the component passes through the second point, thereby detecting the second time.

Clause 37. The method of clause 36, wherein the controller calculates a difference between the first time and the second time, thereby determining the time interval and determines the velocity based on the time interval and a distance between the first point and the second point.

Clause 38. The method of any one of clauses 33 to 37, wherein the at least one sensor comprises an optical position sensor.

Clause 39. The method of any one of clauses 30 to 38, wherein the first point, the second point, or both are located at a distance of at least about 20% of the length of the delivery tube from an outlet of the delivery tube connected to the assembly area.

Clause 40. The method of any one of clauses 29 to 39, wherein the predefined velocity range is derived from a database of measured velocities of a plurality of identical components moving in the delivery tube, using a machine learning algorithm, wherein the monitored component is of the same type as the identical components.

Clause 41. The method of any one of clauses 30 to 40, further comprising redirecting a component which has a velocity outside of the predefined velocity range before it reaches the assembly area.

Clause 42. The method of clause 41, wherein the redirecting is induced by the controller. Clause 43. The method of any one of clauses 29 to 42, further comprising alerting a technician about a component which has a velocity outside of the predefined velocity range.

Clause 44. The method of any one of clauses 29 to 43, wherein the movement of the component through the delivery tube is enabled by a positive or negative pressure within the tube.

Clause 45. The method of clause 44, further comprising altering the pressure within the delivery tube upon detection of two or more consecutive components which each have a velocity outside of the predefined velocity range.

Clause 46. The method of clause 45, wherein an extent to which the pressure is altered is based on a correlation between the velocity of the component and the pressure within the delivery tube that is derived from a database of measured velocities of a plurality of identical components moving in the delivery tube at different pressures, using a machine learning algorithm, wherein the monitored component is of the same type as the identical components.

Clause 47. The method of any one of clauses 29 to 46, wherein the component comprises a fastener.

While the present invention has been particularly described, persons skilled in the art will appreciate that many variations and modifications can be made. Therefore, the invention is not to be construed as restricted to the particularly described embodiments, and the scope and concept of the invention will be more readily understood by reference to the claims, which follow.

The invention claimed is:

1. A system comprising:
a feeder device;
a delivery tube comprising:
an inlet that is connected to the feeder device,
a first outlet that is connected to an assembly area, and
a second outlet that is not connected to the assembly area;
a sensor configured to:
detect a component when the component passes through a first point and through a second point within the delivery tube; and
a controller; configured to:
allow passage of the component from the inlet to the first outlet when a velocity of the component is within a predefined velocity range, and
redirect the component to the second outlet when the velocity is outside of the predefined velocity range.

2. The system of claim 1, wherein the first point, the second point, or both are located at a distance of at least about 20% of a length of the delivery tube from an outlet of the delivery tube connected to the assembly area.

3. The system of claim 1, further comprising a valve that is located along the delivery tube and connects the inlet with the first outlet and the second outlet, wherein the valve is operatively coupled to the controller.

4. The system of claim 3, wherein the delivery tube is composed of a first segment extending between the inlet and the valve, a second segment extending between the valve and the first outlet, and a third segment extending between the valve and the second outlet, and the sensor is located along the first segment.

5. The system of claim 3, wherein the controller is configured to redirect the component by actuating the valve.

6. The system of claim 1, wherein the sensor is configured to send a first signal to the controller in response to the component passing through the first point and to send a second signal to the controller in response to the component passing through the second point.

7. The system of claim 6, wherein the sensor is operatively coupled to a time monitoring system and wherein the controller is configured to record the first signal and the second signal as a function of time.

8. The system of claim 6, wherein the controller is configured to determine a time interval between the first signal and the second signal and to determine the velocity of the component based on the time interval and a distance between the first point and the second point.

9. The system of claim 1, wherein the sensor comprises a first sensor located in proximity to the first point and a second sensor located in proximity to the second point, and the controller receives a first signal from the first sensor when the component passes through the first point and a second signal from the second sensor when the component passes through the second point.

10. The system of claim 1, wherein the controller is further configured to compare the velocity to the predefined velocity range.

11. The system of claim 10, further comprising an indicator configured to provide an indication about the component which has the velocity outside of the predefined velocity range.

12. The system of claim 10, further comprising a pressure source configured to establish a positive or negative pressure within the delivery tube, wherein the pressure source is operatively coupled to the delivery tube and controlled by a pressure regulator operatively coupled to the controller, and the controller is configured to activate the pressure regulator to alter the positive or negative pressure within the delivery tube upon detection of two or more consecutive components which each have the velocity outside of the predefined velocity range.

13. The system of claim 1, wherein the controller comprises a readable memory for storing data and a machine learning algorithm configured to analyze the stored data.

14. The system of claim 13, wherein the controller is configured to analyze a database of measured velocities of a plurality of identical components moving in the delivery tube, using the machine learning algorithm to derive the predefined velocity range, wherein the detected component is of the same type as the identical components.

15. The system of claim 13, wherein the controller is configured to analyze a database of measured velocities of a plurality of identical components moving in the delivery tube at different pressures, using the machine learning algorithm, wherein the detected component is of the same type as the identical components, to provide a correlation between the velocity of the detected component and the different pressures within the delivery tube, and wherein an extent to which the different pressures are altered is based on the correlation.

16. The system of claim 1, wherein the sensor comprises a position sensor.

17. A method comprising:
detecting, using a sensor, a component when the component passes through a first point and through a second point within a delivery tube, wherein the delivery tube comprises:
an inlet that is connected to a feeder device,
a first outlet that is connected to an assembly area, and
a second outlet that is not connected to the assembly area;
determining, using a controller, a velocity of the component that moves within the delivery tube;
comparing, using the controller, the velocity to a predefined velocity range.

18. The method of claim 17, wherein redirecting of the component further comprises actuating a valve.

19. The method of claim 17, further comprising:
sending, using the sensor, a first signal to the controller in response to the component passing through the first point; and
sending, using the sensor, a second signal to the controller in response to the component passing through the second point.

20. A computer-readable medium storing instructions that, when executed by one or more processors, causes the one or more processors to:
detect, using a sensor, a component when the component passes through a first point and through a second point within a delivery tube, wherein the delivery tube comprises:
an inlet that is connected to a feeder device,
a first outlet that is connected to an assembly area, and
a second outlet that is not connected to the assembly area;
determine, using a controller, a velocity of the component that moves within the delivery tube;
compare, using the controller, the velocity to a predefined velocity range;

allow passage of the component from the inlet to the first
   outlet when the velocity is within the predefined veloc-
   ity range, and
redirect the component to the second outlet when the
   velocity is outside of the predefined velocity range.

\* \* \* \* \*